United States Patent Office 3,007,994
Patented Nov. 7, 1961

3,007,994
AMALGAMATION OF ZINC
Lewis F. Urry, Parma, Ohio, assignor to Union Carbide Corporation, a corporation of New York
No Drawing. Filed July 10, 1958, Ser. No. 747,583
5 Claims. (Cl. 136—126)

This invention relates to the amalgamation of zinc in the presence of an alkaline environment within a cell.

It has long been the practice to amalgamate zinc metal prior to using the same in current-producing devices. Amalgamation of zinc anodes improves the cell shelf storage properties, and inhibits the self-corrosion of the metal. Generally amalgamation of zinc is effected by displacement of mercury from mercuric chloride solution in an acid medium or by the direct addition of mercury. Regardless of which of these methods is employed, the zinc is treated prior to its incorporation in a cell.

In the case of the newly developed extended area zinc anodes, amalgamation of thin sheets of foil or sprayed zinc by prior art methods is very difficult, for the mercury renders zinc brittle, and causes thin sheets to crumble upon handling. In addition to the previously mentioned disadvantage, delayed use of amalgamated zinc constitutes a safety hazard arising from loss of mercury through evaporation.

The main object of the invention, therefore, is to provide means for effecting the amalgamation of zinc in the alkaline environment of a cell wherein the amalgamating materials are held inert in a dry state, but positioned against the external surface of the zinc metal until such time as they come in contact with cell electrolyte.

In the practice of the invention an aqueous solution of mercuric oxide of paint consistency having an approximately neutral pH to litmus paper and containing also a binder, is applied to a zinc surface. Since the paint is neutral, no displacement of the mercury takes place, but the mercuric oxide is held in close proximity to the zinc surface. Mercuric oxide is only slightly soluble in alkali, and, therefore, if it is not in contact with the zinc, amalgamation is very slow. At the same time the mercuric oxide fixed in place is completely shielded by the binder. From a safety standpoint, as well as from the economics of handling, this is important, since mercuric oxide dust in the air is a definite safety hazard. When the coated zinc comes in contact with alkaline electrolyte, usually after it has been safely positioned in the cell, the binder picks up liquid and swells, the mercury of the mercuric oxide displaces zinc, and amalgamation of the zinc takes place.

The binder used in the paint composition of the invention can be any one of a number of gelling agents stable in alkaline electrolyte, and the gel film of which retains its properties in the dry state without cracking, flaking or otherwise unduly affecting the mercuric oxide. For use in a cell containing potassium hydroxide electrolyte, sodium carboxymethyl cellulose is the preferred binder. Starch is the preferred paint binder for the sodium hydroxide electrolyte system. Also suitable as binding agents are the hydroxy alkyl cellulose ethers. These materials are characterized by their ability to swell in alkaline electrolyte and to absorb the same.

The range of constituents used in the amalgamating solutions of the invention is:

| | Percent by weight |
|---|---|
| Binder | 0.5 to 3.0 |
| Mercuric oxide (yellow) particles | 10 to 40 |
| Water | balance |

Viscosity and consistency of the mixture may be varied by appropriate changes in carboxymethyl cellulose and water proportions relative to the mercuric oxide. The level of amalgamation may be regulated by adjusting both the mercuric oxide concentration and the amount of the "paint" applied per unit weight of zinc. For example, the application of 0.312 gram of the described "paint" per gram of zinc results in a 7 percent concentration of mercury; whereas, 0.172 gram of "paint" per gram of zinc is equivalent to a 4 percent mercury concentration. The 7 percent level of amalgamation is most desirable for the sprayed zinc anodes of the type disclosed and claimed in the copending application of P. A. Marsal, Serial No. 747,769, filed even day herewith.

In an example of the practice of the invention, an anode sheet formed by spraying metallic zinc onto a strip of muslin was coated with a paint solution of the following formulation:

| | Percent by weight |
|---|---|
| Sodium carboxymethyl cellulose | 1.3 |
| Yellow mercuric oxide | 26.12 |
| Water | 72.57 |

The painted zinc was allowed to dry, and was cut into strips of sufficient length to provide the proper weight of zinc for various cells (12 to 15 grams for a D-size cell).

Optionally, a protective coating of clear binder gel may be applied after the paint has dried. This additional coating is desirable in that it provides a cover coat which gives additional mechanical shielding over the mercuric oxide paint and prevents loss of mercuric oxide in abusive handling. This loss would constitute a quality shortcoming as well as a safety hazard in production operations.

The actual performance of a cell having its anode amalgamated by this process does not differ from that obtained through the usual amalgamation procedure. The advantages gained by means of the amalgamation in situ lie primarily in that prior to amalgamation, the cell is in a completely inactive condition, and cannot corrode or lose mercury. Corrosion or mercury loss necessarily results in poor cell performance and mercury vapor loss may constitute a health hazard. These advantages are particularly important for reserve cell applications.

Delaying the amalgamation until the zinc is in position in the cell also facilitates better construction techniques, e.g., other amalgamation methods are impractical when the sprayed zinc anode is employed. A thin sheet of sprayed zinc becomes so brittle upon amalgamation that it cannot be rolled for insertion into the cell without breakage.

Obviously zinc or zinc-coated or zinc-sprayed materials of any shape and size may be treated in accordance with the present method. Further, the amalgamating solutions herein disclosed may be sprayed, painted or applied by immersing the zinc object therein.

What is claimed is:

1. A method of amalgamating zinc metal in situ in an alkaline environment, which method comprises applying to the metal surface a neutral organic binder solution of paint consistency containing mercuric oxide with a binder, and drying said solution on said surface, said binder being capable of swelling in alkaline electrolyte to absorb the same and wet said mercuric oxide, thereby causing displacement of said zinc by mercury of said mercuric oxide and consequent amalgamation of said zinc.

2. The method of claim 1 wherein said organic binder is selected from the group consisting of carboxymethyl cellulose, starch and the hydroxyethyl cellulose ethers.

3. The method of claim 1 additionally characterized by the application of a protective coating of clear binder gel to said metal surface after said solution applied thereon has dried.

4. An amalgamating solution for amalgamating zinc anodes comprising from 10 to 40 percent by weight of mercuric oxide, from 0.5 to 3.0 percent by weight of an organic binder selected from the group consisting of sodium carboxymethyl cellulose, starch and the hydroxyalkyl cellulose ethers, the balance water.

5. In combination with a zinc anode for primary galvanic cells a coating on the external surface thereof, said coating consisting of mercuric oxide particles secured to said surfaces by means of an electrolyte-absorbent chemical binder.

References Cited in the file of this patent

UNITED STATES PATENTS

| | | |
|---|---|---|
| 1,824,626 | Ruhoff et al. | Sept. 22, 1931 |
| 2,551,799 | Hatfield | May 8, 1951 |

FOREIGN PATENTS

| | | |
|---|---|---|
| 164,062 | Great Britain | May 30, 1921 |